United States Patent [19]

Kozawa

[11] 3,925,102
[45] Dec. 9, 1975

[54] DIVALENT SILVER OXIDE CELL HAVING A UNIPOTENTIAL DISCHARGE LEVEL

[75] Inventor: Akiya Kozawa, Middleburg Heights, Ohio

[73] Assignee: Union Carbide Corporation, New York, N.Y.

[22] Filed: June 25, 1974

[21] Appl. No.: 483,014

[52] U.S. Cl. ............... 136/111; 136/20; 136/120 R
[51] Int. Cl.² .................... H01M 6/12; H01M 4/24
[58] Field of Search .... 136/20, 30, 107, 111, 120 R

[56] References Cited
UNITED STATES PATENTS
2,795,638   6/1957   Fischbach ................... 136/120 R OTHER PUBLICATIONS
"The Primary Battery", Vol. I, edited by Heise & Cahoon, Wiley, N.Y. (1971), pages 226–229.
"Zinc-Silver Oxide Batteries", edited by Fleischer & Lander, Wiley, N.Y. (1971), pages 210–211.

*Primary Examiner*—John H. Mack
*Assistant Examiner*—Aaron Weisstuch
*Attorney, Agent, or Firm*—Cornelius F. O'Brien

[57] ABSTRACT

An alkaline silver oxide cell having a negative electrode, an alkaline electrolyte, a positive electrode comprising divalent silver oxide housed in a positive terminal cylindrical container having an upstanding wall and a closed end, and wherein an oxidizable metal strip, such as a zinc ring, is interposed between the positive electrode and the inner upstanding wall of the container so as to achieve a cell having a unipotential discharge level on low drain conditions.

12 Claims, 4 Drawing Figures

DIVALENT SILVER OXIDE CELL HAVING A UNIPOTENTIAL DISCHARGE LEVEL

FIELD OF THE INVENTION

This invention relates to alkaline silver oxide cells, and specifically to such cells wherein the positive electrode comprises divalent silver oxide housed in a cylindrical conductive container, and wherein an oxidizable metal ring is interposed between the positive electrode and the upstanding wall of the conductive container.

BACKGROUND OF THE INVENTION

Miniature button alkaline silver oxide cells have gained wide acceptance in the battery industry for many applications because they are characterized as being high capacity, small volume electric cells. In other words, they have a high power output and energy density per unit weight and unit volume of active cathode material. However, one of the major disadvantages of silver oxide cells is that they discharge at two different potentials. This is due to the fact that the active materials of such cells are usually both divalent silver oxide (AgO) and monovalent silver oxide ($Ag_2O$). Silver oxide cells using monovalent silver oxide as the only active cathode material will have a theoretical unipotential discharge at about 1.57 volts but the capacity in milliampere hours per gram of monovalent silver oxide is substantially lower than the capacity of divalent silver oxide. On the other hand, silver oxide button cells using divalent silver oxide as the only active cathode material will discharge at a first potential at about 1.7 volts across a 300-ohm resistor for 40 hours, for example, and then drop to approximately 1.5 volts for an additional period of time of about 70 hours. Thus monovalent silver oxide cells have the advantage of discharging at a unipotential plateau with the disadvantage of having a rather low capacity while divalent silver oxide cells have the advantage of having a rather high capacity but the disadvantage of discharging at two distinct voltage plateaus. Divalent silver oxide has about 1.9 times more capacity per gram than monovalent silver oxide and about 2 times more capacity per unit volume than monovalent silver oxide.

Many cell or battery applications, particularly transistorized devices such as hearing aids, watches and the like, require a substantial unipotential discharge source for proper operation and, therefore, cannot use the dual voltage level discharge which is characteristic of divalent silver oxide cells.

Consequently, many methods have been proposed for obtaining a unipotential discharge from a divalent silver oxide cell. One method disclosed in U.S. Pat. Nos. 3,615,858, and 3,655,450, entails providing a continuous layer of monovalent silver oxide in physical and electrical contact with a divalent silver oxide pellet. During assembly of the cell the cathode pellet is disposed against the inner surface of a cathode cup or collector whereupon the layer of monovalent silver oxide physically isolates the divalent silver oxide from contact with the cathode cup so that the sole electronic path for discharge of the divalent silver oxide is through the monovalent silver oxide layer.

In U.S. Pat. No. 3,476,610 a silver oxide battery is disclosed which employs a positive electrode comprised mainly of divalent silver oxide with the addition of monovalent silver oxide present in part as an electrolyte-impermeable masking layer. This layer isolates the divalent silver oxide from contact with the electrolyte of the battery until discharge begins whereupon the monovalent silver oxide becomes electrolyte-permeable. When this occurs, the electrolyte then begins to contact the divalent silver oxide. In addition, the monovalent silver oxide is also present as an interposed layer between the divalent silver oxide and the inner surface of the cathode cup or collector so as to isolate the divalent silver oxide from physical contact with said cathode cup which is the positive terminal of the cell.

In U.S. Pat. No. 3,484,295 a silver oxide battery is disclosed which utilizes a positive silver electrode comprising divalent silver oxide and monovalent silver oxide. The latter oxide is employed as an electrolyte-impermeable layer which is interposed between the divalent silver oxide and the battery components containing the electrolyte so as to isolate the divalent silver oxide from contact with the electrolyte until the monovalent silver material is discharge. If the discharge product of the monovalent silver material is oxidized by the divalent silver material in the presence of the battery electrolyte then it is possible that the battery will yield a unipotential discharge.

Although it is theoretically possible to produce a unipotential discharge from a divalent silver oxide cell using the above teachings, it requires a high degree of quality control to insure that the necessary layer of monovalent silver oxide is disposed in its proper location so as to prevent any of the divalent silver oxide from directly contacting the cathode or positive terminal in one cell arrangement and/or the electrolyte of the cell in another arrangement.

My copending patent application Ser. No. 482,996 filed June 25, 1974 discloses another approach to producing divalent silver oxide cells having a unipotential discharge level on low drain conditions. The cells use a positive electrode comprising divalent silver oxide housed in a positive cathode container and interposed between the positive electrode and the inner wall of the cathode container and/or between the positive electrode and the separator is a discontinuous oxidizable metal, such as a zinc screen, which functions to isolate a portion of the positive electrode from the container so as to produce a unipotential discharge on low drain conditions.

Another of my copending patent applications Ser. No. 482,995 filed June 25, 1974 discloses a process whereby silver oxide cells having a positive electrode comprising divalent silver oxide housed in a cathode container are given a predischarge on a high current drain such that a substantial silver layer is formed at the interface between the positive electrode and the cathode container with the concentration of silver decreasing from a maximum at the interface to a minimum within the center portion of the positive electrode.

Accordingly, it is the primary object of this invention to provide a silver oxide cell which employs a positive electrode comprising divalent silver oxide and which has a substantially unipotential discharge plateau over the useful life of the cell.

Another object of this invention is to provide a silver oxide cell which employs a positive electrode comprising divalent silver oxide and which has a predictable discharge potential curve.

Another object of this invention is to provide a silver oxide cell which employs an oxidizable metal ring disposed between a portion of the cell's positive electrode and the inner upstanding surface of the cell's cylindrical cathode container, said positive electrode comprising divalent silver oxide and said cylindrical cathode container being the positive terminal of the cell.

Another object of this invention is to provide a silver oxide cell which employs an oxidizable zinc ring interposed between a portion of the cell's positive electrode and the inner upstanding surface of the cell's cylindrical cathode container.

SUMMARY OF THE INVENTION

The invention relates to an alkaline silver oxide cell having a negative electrode, a positive electrode comprising divalent silver oxide and an electrolyte housed within a two-part conductive container comprising an upper section and a cylindrical lower section having an upstanding wall and a closed end; said cylindrical lower section housing the positive electrode and wherein at least one oxidizable metal strip is interposed between, and electrically and physically in contact with, said positive electrode and the inner upstanding wall of the cylindrical lower section so as to produce a unipotential discharge level on low drain conditions.

As used herein, a metal strip shall mean a long narrow sheet of metal formed into a ring by any conventional means such as bending, molding or the like and having any shaped radial cross-sectional area such as square, rectangle, circle, L-shape or the like. The strip may be one continuous ring without any seams, or it may comprise two or more metal segments having one or more seams. The metal strip may also be composed of two or more arcuate segments that are not seamed together but when they are disposed within a cell in accordance with this invention, they define a ring having one or more unjointed areas.

The outer surface area of the metal strip that contacts the inner upstanding wall of the cylindrical section of the container housing the positive electrode should be at least about 5% of the area of the inner upstanding wall that would be contacted by the positive electrode if the ring were not present. This minimum outer surface area of the metal strip is preferred so as to insure sufficient electrical and physical contact of the metal with both the cathode container and the positive electrode since, without sufficient contact with the container, the metal ring will be isolated and will not function for the purpose of this invention. The projected area of the metal strip perpendicular to the inner upstanding wall of the cylindrical section of the cathode container should be at least about 30% of the area of the plane perpendicular to the upstanding wall and defined by said upstanding wall. This minimum projected surface area of the metal strip perpendicular to the inner upstanding wall of the cathode container is necessary to insure that sufficient oxidizable metal material will be available to react with the positive electrode in the presence of the cell's electrolyte to form metallic silver and possibly a layer of monovalent silver oxide with or without the oxide of the oxidizable metal, which, in turn, will initiate the formation of metallic silver between the interface of the positive electrode and the cathode container.

The amount of the oxidizable metal strip used, as based on the capacity of the total active cathode material, should be at least about 0.5%, with an upper limit being less than that which would completely reduce the divalent silver oxide to the monovalent level. A practical range of oxidizable metal strip should be between about 5% and about 15% of the divalent silver oxide capacity. The use of less than the lower limit of 0.5% would provide insufficient oxidizable metal to effectively react with the cathode to produce the unipotential discharge.

Thus we see that in addition to a limitation on the overall size of the metal strip, as based on the capacity of the positive electrode, according to this invention, the strip has to have a contact area and a projected area perpendicular thereto within the specific minimum limitations discussed above.

When using oxidizable metal material within the upper range of the overall size limitation, it is preferable to employ an electronically insulating disc, such as plastic, disposed between the positive electrode and the closed end of the cathode container. The use of the electronically insulating disc will tend to restrict or limit the formation of metallic silver to the area between the positive electrode and the upstanding wall of the cathode container. This embodiment has been found to provide a more stable system than would be obtained in the absence of the disc. By stability is meant the ability of the cell to discharge at the unipotential level within a shorter time period on initial and subsequent discharges.

As used in this invention, oxidizable metal shall mean a metal that will electrochemically react with divalent silver oxide in the presence of the electrolyte of the cell during storage or during the initial discharge of the cell so as to produce metallic silver with possibly a minor amount of monovalent silver oxide with or without the oxide of the oxidizable metal which will effectively produce a unipotential discharge. A suitable metal for use in this invention can be selected from the group consisting of zinc, copper, silver, tin, cadmium and lead. Of the above metals, zinc is preferable in zinc anode systems because it introduces no foreign ions into the cell and will easily form zinc oxide in the presence of an alkaline electrolyte. Furthermore, since zinc oxide has a low electrical resistance, it will provide a good electrical path between the silver oxide and the cathode container. Similarly when using a cadmium anode system, cadmium would be preferred as the oxidizable metal.

The active cathode material of this invention can be 100% divalent silver oxide or a mixture of divalent silver oxide and monovalent silver oxide. When using a mixture of the silver oxides, preferably at least 50% by weight of the mixture should be divalent silver oxide because of its high capacity characteristics. The silver oxide electrode can be formed in a number of ways as, for example, finely divided divalent silver oxide powder, mixed with or without monovalent silver oxide can be pelletized into a desired size pellet using a conventional die. Regardless of how the electrode is made, it has to be sufficiently porous to permit the electrolyte of the cell to diffuse through the electrode. However, the pellet also has to be sufficiently dense so that it can occupy a relatively small space when used in miniature type cell housings if it is to provide the required capacity for such cells.

As stated above, it is believed that the reaction between the oxidizable metal strip and the silver oxide cathode occurs on contact with the electrolyte to reduce a portion of the divalent silver oxide to metallic silver and possibly a minor amount of monovalent silver oxide with or without the oxide of the oxidizable metal as stated above. This reaction, in turn, will initiate the formation of metallic silver at the common contact area between the divalent silver oxide electrode and the inner surface of the cathode container. This reaction will occur during shelf storage.

DESCRIPTION OF THE PREFERRED EMBODIMENT

Figure 1:
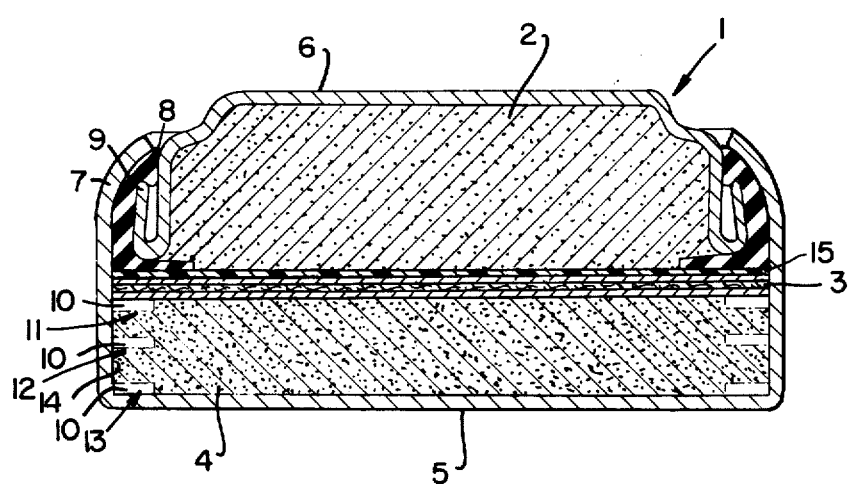
FIG. 1 is a cross-sectional view of a miniature button size silver oxide cell having an oxidizable metal ring disposed in three different locations between the positive silver oxide electrode and the inner upstanding wall of the positive cathode container of the cell in accordance with the present invention.

The preferred embodiment of this invention can be described in conjunction with the drawings. Referring to FIG. 1, there is shown a sectional elevation of a silver oxide cell 1 having a negative electrode 2, separator 3 and positive electrode 4 housed within a two-part container comprising a cathode container 5 and anode cup 6. As shown, cathode container 5 has a flange 7 which is crimped inwardly against a U-shaped flange 9 of anode cup 6 via grommet 8 during assembly to seal the cell as disclosed in U.S. Pat. No. 3,069,489. The cathode container 5 may be made of nickel-plated steel, nickel, stainless steel, or the like, while the anode cup 6 may be made of tin-plated steel, copper-clad stainless steel, gold-plated copper-clad stainless steel or the like. The grommet 8 may be made of a suitable resilient electrolyte-resistant material such as neoprene, nylon, or the like.

The separator 3 may be a three-layer laminate consisting of two outer layers of radiation-grafted polyethylene and an inner cellophane layer or the like. Disposed between anode 2 and separator 3 is a layer of electrolyte-absorbent material 15 which may consist of various cellulosic fibers.

The anode (negative) electrode can comprise a lightly compressed pellet 2 of finely divided amalgamated zinc, containing, if desired, a gelling agent. The cathode (positive) electrode can comprise a rather densely compressed pellet 4 of divalent silver oxide powder or a mixture of divalent silver oxide powder and monovalent silver oxide powder.

The cell electrolyte may be an aqueous solution of potassium hydroxide, sodium hydroxide, or mixtures thereof.

Figure 2:
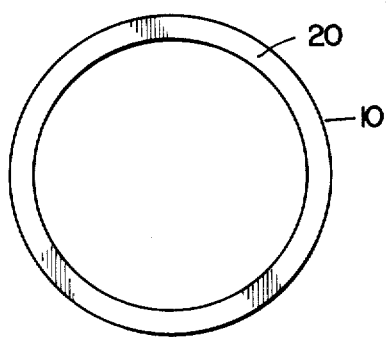
FIG. 2 is a top view of an oxidizable metal ring which is suitable for use in a silver oxide cell as shown in FIG. 1.
Figure 3:
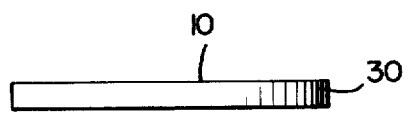
FIG. 3 is a side view of the oxidizable metal ring shown in FIG. 2.

As shown in FIG. 1, an oxidizable metal ring 10, can be interposed in three different positions, 11, 12 and 13, between positive electrode 4 and the upstanding inner wall 14 of cathode container 5. Metal ring 10 is of the type shown in FIGS. 2 and 3 and comprises a surface 20 which is the surface of ring 10 perpendicular to the upstanding inner wall 14 of cathode container 5 and a surface 30, shown in FIG. 3, which is the surface of ring 10 that contacts the inner upstanding wall 14 of cathode container 5.

As shown in FIG. 1, metal ring 10 can be located at the peripheral top section 11 of electrode 4, the peripheral mid-section 12 of electrode 4 or the peripheral bottom section 13 of electrode 4. In the case where metal ring 10 is to be located at position 11, then the metal ring is placed at the top of the positive silver oxide electrode after the electrode is placed in cathode container 5 and then it is compressed into a flush-mounted position with said electrode as shown in FIG. 1. In the case where metal ring 10 is to be located at position 12, then after about half of the silver oxide cathode material is compressed in the cathode container, metal ring 10 is inserted into the container. Thereafter, the other half of the silver oxide cathode material is placed in the container and then the overall electrode is compressed by conventional means. In the case where metal ring 10 is to be located at position 13, then the metal ring 10 is first placed into the bottom of the container followed thereafter with the silver oxide cathode material. The silver oxide cathode material and metal ring arrangement are then compressed or molded in place.

Figure 4:
FIG. 4 is a radial cross-sectional view of an oxidizable metal ring suitable for use in this invention.

FIG. 4 shows another embodiment of an oxidizable metal ring 40 having a circular cross-sectional area 41.

The metal ring 10, 40 should be little larger in diameter than the internal diameter of cathode container 5 to insure good electrical contact between the two after assembly.

The preferred embodiment of this invention would be the assembly of ring 10, 40 in position 11 because the ring is then in a position more readily accessible to electrolyte contact so as to produce the above-discussed reactions between the ring and the cathode.

It is also within the scope of this invention to use more than one ring in a silver oxide cell and locate each of them at one of the positions identified as 11, 12 and 13. However, the overall size requirement for the two or more metal rings must be within the limits specified above.

It is also within the scope of this invention to connect two or more cells in series or parallel by conventional means and then place them in a housing to produce a battery which can be used in various battery operated devices.

EXAMPLE 1

Two miniature button cells (0.450 inch diameter and about 0.190 inch height) of the type shown in FIG. 1 were produced using a gelled zinc powder anode, a pellet of active cathode material of 100% AgO molded at about a 2-ton pressure and a three-layer separator consisting of two outer layers of radiation-grafted polyethylene and an inner cellophane layer. An additional layer of electrolyte-absorbent material was placed adjacent the zinc anode. These components along with a 22% NaOH electrolyte (5.5 M NaOH) were assembled in a nickel-plated cathode container and a gold-plated copper-clad stainless steel anode cup and then the cell was sealed by crimping the top annular section of the cathode container inwardly against the anode cup via a grommet of nylon as described in U.S. Pat. No. 3,069,489.

Each cell, when discharged across a 96 K-ohm resistor at room temperature on a drain of 16 microamperes, exhibited the higher AgO voltage level. On a continuous discharge, it took the two cells an average of 22 hours before the higher divalent oxide voltage dropped to the monovalent voltage level.

EXAMPLE 2

One cell, identical to the miniature button cells of Example 1, was produced, except that a zinc ring, 0.0115 inch thick, ID 0.390 inch and OD 0.453 inch, was interposed between the positive electrode and the cathode container of the cell in a position designated by the number 11 as shown in FIG. 1 and an electronically insulating disc was disposed between the bottom surface (closed end) of the cathode container and the positive electrode.

The cell was then discharged across a 6.5 K-ohm load and immediately discharged at the voltage level of the monovalent silver oxide.

EXAMPLE 3

One cell, identical to the miniature button cells of Example 1, was produced, except that a zinc ring, 0.0115 inch thick, ID 0.328 inch, and OD 0.453 inch, was interposed between the positive electrode and the cathode container of the cell in a position designated by the number 11 as shown in FIG. 1, and an electronically insulating disc was disposed between the bottom surface (closed end) of the cathode container and the positive electrode.

The cell was then discharged across a 6.5 K-ohm load and immediately discharged at the voltage level of the monovalent silver oxide.

EXAMPLE 4

One cell, identical to the miniature button cells of Example 1, was produced, except that a zinc ring, 0.0115 inch thick, ID 0.328 inch and OD 0.453 inch, was interposed between the positive electrode and the cathode container of the cell in a position designated by the number 13 as shown in FIG. 1, and an electronically insulating disc was disposed between the bottom surface (closed end) of the cathode container and the positive electrode.

The cell (1.84 O.C.V.) was then discharged across a 6.5 K-ohm load and after a period of one hour on discharge, the voltage of the cell dropped from 1.72 volts to 1.56 volts which is the discharge voltage level of the monovalent silver oxide.

EXAMPLE 5

One cell, identical to the miniature button cells of Example 1, was produced, except that a zinc ring, 0.0115 inch thick, ID 0.390 inch, and OD 0.453 inch, was interposed between the positive electrode and the cathode container of the cell in a position designated by the number 13 as shown in FIG. 1, and an electronically insulating disc was disposed between the bottom surface (closed end) of the cathode container and the positive electrode.

The cell (1.86 O.C.V.) was then discharged across a 6.5 K-ohm load and after a period of one hour on discharge, the voltage of the cell dropped from 1.82 volts to 1.57 volts which is the discharge level of the monovalent silver oxide.

From the above examples, we see that using the teaching of this invention a silver oxide cell using a divalent silver oxide cathode can exhibit a monovalent voltage level of about 1.57 volts.

It is to be understood that other modifications and changes to the preferred embodiments of the invention herein shown and described can also be made without departing from the spirit and scope of the invention.

What is claimed is:

1. In an alkaline silver oxide cell comprising a negative electrode, a positive electrode comprising divalent silver oxide, an electrolyte, and a two-part conductive container comprising an upper section and a cylindrical lower section having an upstanding wall and a closed end; said cylindrical lower section housing the positive electrode, the improvement wherein at least one oxidizable metal strip is interposed between and in electrical and physical contact with said positive electrode and the inner upstanding wall of the cylindrical lower section so that the electrochemical reaction of the oxidizable metal strip in the presence of the electrolyte will produce a substantially unipotential discharge over the useful life of the cell.

2. The alkaline silver oxide cell of claim 1 wherein said positive electrode is a mixture of monovalent silver oxide and at least 50% by weight of divalent silver oxide.

3. The alkaline silver oxide cell of claim 2 wherein said positive electrode is a mixture of 50% by weight monovalent silver oxide and 50% by weight divalent silver oxide.

4. The alkaline silver oxide cell of claim 1 wherein said oxidizable metal strip is a metal ring and wherein said metal ring is disposed at the peripheral top section of said positive electrode.

5. The alkaline silver oxide cell of claim 4 wherein an electronically insulating disc is disposed between the positive electrode and the closed end of the cylindrical lower section of the housing.

6. The alkaline silver oxide cell of claim 1 wherein said oxidizable metal strip is a metal ring and wherein said metal ring is disposed at the peripheral mid-section of said positive electrode.

7. The alkaline silver oxide cell of claim 6 wherein an electronically insulating disc is disposed between the positive electrode and the closed end of the cylindrical lower section of the housing.

8. The alkaline silver oxide cell of claim 1 wherein said oxidizable metal strip is a metal ring and wherein said metal ring is disposed at the peripheral bottom section of said positive electrode.

9. The alkaline silver oxide cell of claim 8 wherein an electronically insulating disc is disposed between the positive electrode and the closed end of the cylindrical lower section of the housing.

10. The alkaline silver oxide cell of claim 4 wherein said metal ring is selected from the group consisting of zinc, copper, silver, tin, cadmium and lead.

11. The alkaline silver oxide cell of claim 6 wherein said metal ring is selected from the group consisting of zinc, copper, silver, tin, cadmium and lead.

12. The alkaline silver oxide cell of claim 8 wherein said metal ring is selected from the group consisting of zinc, copper, silver, tin, cadmium and lead.

* * * * *